United States Patent
Gyorfi

(10) Patent No.: US 9,158,740 B2
(45) Date of Patent: Oct. 13, 2015

(54) SYSTEMS AND METHODS FOR SPEED ESTIMATION BASED ON STRIDE DATA USING PREDICTIVE MODELING

(71) Applicant: GOOGLE TECHNOLOGY HOLDINGS LLC, Mountain View, CA (US)

(72) Inventor: Julius S. Gyorfi, Vernon Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 361 days.

(21) Appl. No.: 13/672,356

(22) Filed: Nov. 8, 2012

(65) Prior Publication Data
US 2014/0129189 A1 May 8, 2014

(51) Int. Cl.
| G06F 17/50 | (2006.01) |
| G06F 17/10 | (2006.01) |
| G01C 21/16 | (2006.01) |
| G01C 22/00 | (2006.01) |

(52) U.S. Cl.
CPC .............. *G06F 17/10* (2013.01); *G01C 21/165* (2013.01); *G01C 22/006* (2013.01)

(58) Field of Classification Search
CPC ... G06F 22/006; G01C 22/006; G01C 21/165
USPC ....................... 342/461; 703/2, 14
See application file for complete search history.

(56) References Cited

U.S. PATENT DOCUMENTS

| 7,245,254 B1 | 7/2007 | Vogt |
| 7,778,633 B2 | 8/2010 | Ward |
| 7,962,312 B2 | 6/2011 | Darley et al. |

(Continued)

FOREIGN PATENT DOCUMENTS

GB    2352348 A    1/2001

OTHER PUBLICATIONS

Harshvardhan Vathsangam, Adar Emken, Donna Spruijt-Metz, Gaurav S. Sukhatme, "Toward Free-Living Walking Speed Estimation Using Gaussian Process-based Regression with On-Body Accelerometers and Gyroscopes" Department of Computer Science University of Southern California, 2010, 8 pages.*

(Continued)

*Primary Examiner* — Dwin M Craig
(74) *Attorney, Agent, or Firm* — Johnson, Marcou & Isaacs, LLC

(57) ABSTRACT

Systems and methods for speed estimation based on stride data using predictive modeling relate to portable wireless devices (202) that contain GPS or other location resources to generate position and speed data. The device (202) also incorporates an accelerometer (212) or other motion sensor. When GPS signals are interrupted, an estimation module (216) and associated logic generates a speed estimate based solely on stride frequency data from the accelerometer (212). Unlike conventional estimators, the estimation module (216) operates on a non-deterministic basis, generating an estimated speed using a joint probability distribution derived from previous speed and stride data captured while positioning signals are available. The estimation module (216) can continue to operate when GPS signals are available, and either filter the GPS speed measures for spurious signals, or further train the estimation module (216) with new position data. The estimation module (216) can also incorporate altitude measurements when estimating speed.

21 Claims, 7 Drawing Sheets

(56) References Cited

U.S. PATENT DOCUMENTS

| | | | |
|---|---|---|---|
| 2007/0270721 A1 | 11/2007 | Ananny et al. | |
| 2008/0176583 A1* | 7/2008 | Brachet et al. | 455/456.3 |
| 2011/0003665 A1 | 1/2011 | Burton et al. | |
| 2011/0032105 A1 | 2/2011 | Hoffman et al. | |
| 2011/0178759 A1* | 7/2011 | Uchida | 702/141 |
| 2012/0083705 A1* | 4/2012 | Yuen et al. | 600/508 |

OTHER PUBLICATIONS

George Barnett, "Calibrating Your Pedometer"; http://www.tobendsports.com/weight-loss/pedometer-calibrating.htm, Dec. 6, 2011, 2 pages.

Patent Cooperation Treaty, "PCT Search Report and Written Opinion of the International Searching Authority" for International Application No. PCT/US2013/067408, Feb. 3, 2014, 13 pages.

Harshvardhan Vathsangam et al., "Toward Free-Living Walking Speed Estimation Using Gaussian Process-based Regression with On-Body Accelerometers and Gyroscopes", 4th Int'l Conf. on Pervasive Computing Tech. for Healthcare, Mar. 22, 2010, pp. 1-8.

O. Perrin et al., "Improvement of walking speed prediction by accelerometry and altimetry, validated by satellite positioning", Medical and Biological Engineering and Computing, Mar. 2000, pp. 164-168, vol. 38. No. 2.

Kamiar Aminian et al., "Estimation of Speed and Incline of Walking Using Neural Network", IEEE Transcations on Instrumentation and Measurement, Jun. 1995, pp. 743-746, vol. 44. No. 3.

\* cited by examiner

SYSTEMS AND METHODS FOR SPEED ESTIMATION BASED ON STRIDE DATA USING PREDICTIVE MODELING

FIELD

The present teachings relate to systems and methods for speed estimation based on stride data using predictive modeling, and more particularly, to platforms and techniques for estimating a speed value for a user of a device in motion, using nondeterministic speed modeling based on detected stride frequency.

BACKGROUND

In competitive running and other personal recreational applications, portable electronic devices may track the location and speed of a user wearing or carrying the device. In conventional devices of this type, the user's speed while running or performing other activities can often be tracked using positioning platforms, including global positioning satellite (GPS) tracking systems, by dividing elapsed distance by elapsed time. Sometimes, however, signals from GPS satellites can be obscured by trees, buildings, weather, and other obstructions. When GPS signals are corrupted or unavailable, the user will often find it convenient to continue to receive an indication of speed using alternative techniques.

An alternative technique that provides a speed value for a runner or other user detects the stride frequency of that user's walking or running pace. It has been known to use an accelerometer built into a portable electronic device to detect the comparatively sharp acceleration at the start of the user's forward stride. By tracking successive strides, the user's stride frequency can be determined.

In known platforms, the stride frequency can be used as an input to a linear, polynomial, or other deterministic model to generate an estimated current speed of the user's walking or running activity. In known estimators of this kind, the device assumes that the user's speed is related to the frequency of their detected strides in a deterministic or closed-form fashion. Sometimes there are different deterministic models for a walking user and a running user. The deterministic models can be based on human biomechanical models or other calculations which assume a direct correspondence between the stride frequency observed for the user and the user's immediate speed at that stride frequency.

However, empirical use of known speed estimator devices has shown that the estimated speed output obtained from these types of deterministic algorithms does not always match up well with actual speed. A user's estimated speed using deterministic models can differ by forty percent or more when compared to the speed as measured by accurate GPS reception.

There is an opportunity to develop methods and systems for speed estimation, in which an estimation of a user's speed while running or performing other activities can be generated with comparatively high accuracy even when GPS or other location services are not available.

DESCRIPTION OF DRAWINGS

The accompanying drawings, which are incorporated in and constitute a part of this specification, illustrate implementations of the present teachings and together with the description, serve to explain the principles of the present teachings. In the figures.

DETAILED DESCRIPTION

Implementations of the present teachings relate to systems and methods for speed estimation based on stride data using predictive modeling. More particularly, implementations relate to platforms and techniques for estimating the speed of a device worn or carried by a user. The device can be equipped with sensing devices including a location module such as a GPS receiver chip for receiving position data from GPS satellites, as well as an accelerometer module to detect motion data in the device locally. When the GPS signals are obscured and/or at other times, the device can be configured to receive a set of stride data from the accelerometer, and use that data to derive an estimate of the user's speed based on a user record which associates previously captured stride data and previously captured speed data (e.g., calculated by dividing elapsed distance by elapsed time).

Logic within the device can then produce an estimate of the user's current speed based on a non-deterministic engine or model which predicts speed based on the current stride measurement, including stride frequency, and the set of previously captured speed data. In implementations, the predictive model or engine can be or include a Bayesian model or engine, although it will be appreciated that other types of models or engines can be used. The predictive model or engine can be based on a joint probability distribution between previously detected speed data and previously detected stride data, rather than a closed-form calculation.

The accuracy of the estimated speed can be enhanced by the fact that the predictive model is based on the record for that user individually, so that the model captures over time the characteristics of that user's speed behavior as it relates to stride data of that user. The user can thus receive a set of calculated and/or estimated speed data on the device which remains accurate under different operating conditions, including those when regular GPS or other positioning services are not available.

Reference will now be made in detail to exemplary implementations of the present teachings, which are illustrated in the accompanying drawings. Where possible the same reference numbers will be used throughout the drawings to refer to the same or like parts.

Figure 1:
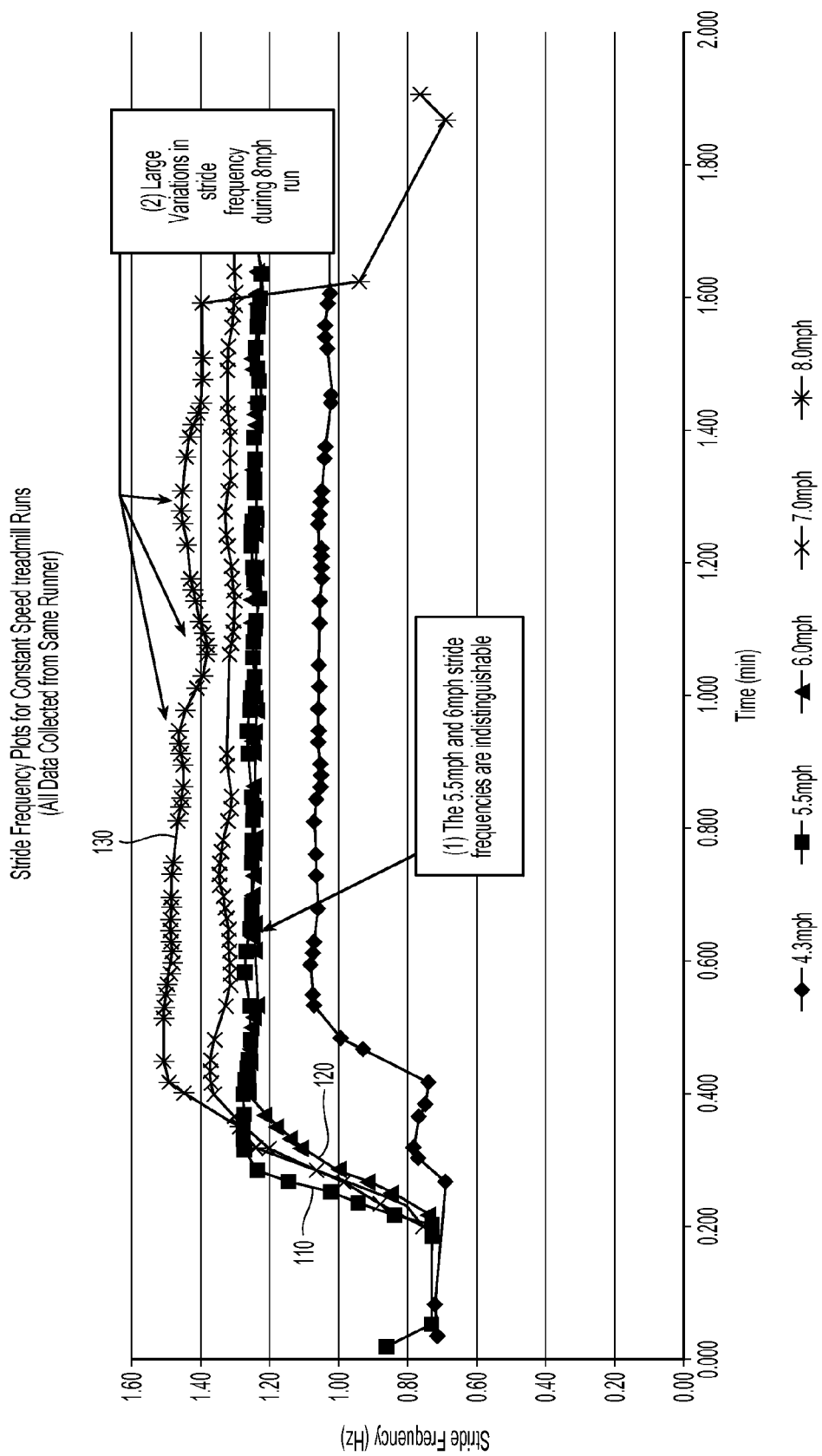
FIG. 1 illustrates empirical data illustrating the relationship between stride frequency and speed for an exemplary user.

FIG. 1 depicts data collected from a single runner performing five separate runs on a treadmill device where each run was at a different, constant speed. The graph of this data shows how stride frequency varied over each run. It may be noted that while known platforms assume there is a closed-form or deterministic relationship between stride frequency and speed, the data shown in FIG. 1 demonstrates that the same stride frequency may result in different actual speeds (lines 110, 120), for the same user. The graph in FIG. 1 furthermore demonstrates that the same speed may be achieved at different stride frequencies (line 130) by the same user. Thus, a deterministic model that matches a particular stride frequency to a unique speed (or stride length, since speed equals stride frequency multiplied by stride length) cannot capture these real-life events when the same stride frequency results in different speeds and when different stride frequencies result in the same speed.

Figure 2:
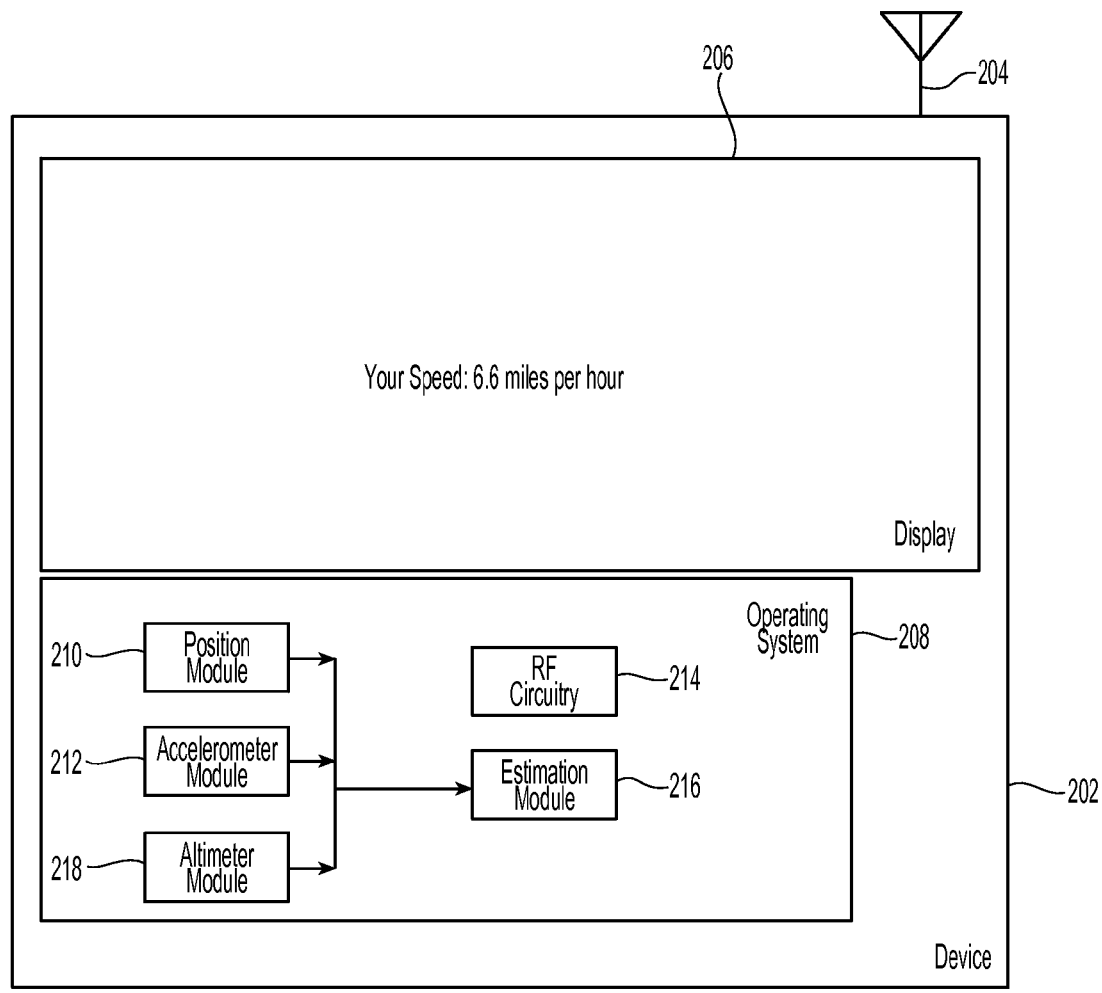
FIG. 2 illustrates a device which can be used in systems and methods for speed estimation based on stride data using predictive modeling, according to various implementations.

FIG. 2 illustrates a device 202 in which systems and methods for speed estimation based on stride data using predictive modeling can operate. As shown, the device 202 can be configured with hardware, software, firmware, services, and/or other resources to permit the device 202 to calculate speeds related to the motion of the device 202 using a satellite positioning system. Using a sequence of locations and a sequence of elapsed times as determined using the satellite positioning system, the device calculates current speed (e.g., change in distance divided by change in time). Each calculated speed value may be recorded along with a stride frequency at the time period that the speed was calculated. When the satellite positioning system is not available to generate accurate location information, the device 202 estimates speed values using the recorded stride frequency, the recorded speed values, the currently-measured stride frequency, and a non-deterministic model for estimating speed based on the currently-measured stride frequency. Note that the "estimated speed" is not a "calculated speed" in the sense that the estimated speed does not use elapsed distance as a variable, while calculated speed uses elapsed distance and elapsed time as variables.

The device 202 can include a network-enabled communication component, such as, for example, a cellular (3GPP, 3GPP2, LTE) transceiver, a WiFi (IEEE 802.11) transceiver, a WiMAX (IEEE 802.16) transceiver, a Bluetooth (IEEE 802.15) transceiver, an infrared transceiver, and/or other standardized or proprietary communication transceivers and communication buses (such as Ethernet and USB). With such a transceiver, the electronic device 202 can support voice and/or data communications and thus may include a dialing (e.g., telephony) application, a messaging (e.g., email, text messaging, instant messaging) application, a digital media (e.g., MP3, MP4) player application, and/or a data synchronization application.

The device 202 can have a small form-factor such as a watch-style device, an arm-band device, a belt-style device, or a head-set device. As shown, the electronic device 202 can host or incorporate a number of hardware, software, and/or other resources, including a display 206 and an operating system 208.

The display 206 can be or include a light-emitting diode (LED) display, liquid crystal display (LCD), and/or displays having other types of panels or illumination elements. In some implementations, the display 206 can incorporate hardware-based input components such as, for example, a capacitive or resistive touch-sensitive panel allowing the user to enter data based on touch-points or other actions on the screen. As noted, the device 202 can be configured in a comparatively small form factor, but the touch screen or display screen may be larger for low-vision applications or other use cases. It may be noted that the device 202 can incorporate other input and output components, such as, for example, audio output via a speaker, audio input via a microphone, and/or user input via mechanical buttons or switches.

As shown, the electronic device 202 can host or incorporate further hardware, software, and/or other services or resources to provide an overall framework for operating the device 202 and conducting input, communications, and/or other activity. The resources of the electronic device 202 can include, for example, an operating system 208 installed on the electronic device 202 and controlling the data storage, processing, communications, and/or other resources of the electronic device 202 and/or accessed via the electronic device 202. The device 202 can incorporate radio frequency (RF) circuitry 214 along with one or more antennas 204, to conduct wireless signaling with local area networks, wide area networks, positioning systems, and/or other networks, nodes, or stations.

The device 202 can also incorporate resources related to the capture and tracking of speed-related data, including, as illustrated, a position module 210, an accelerometer module 212, and an estimation module 216. In implementations, the position module 210 can be or include a GPS receiver chip, platform, service, and/or module, capable of receiving signals from four or more GPS satellites and translating those signals into comparatively accurate position (e.g., latitude, longitude, and optionally altitude), location, Doppler speed, elevation, time, and/or other data. From the GPS location and time information, the position module 210 can calculate speed by dividing change in location by change in time.

Alternately, in implementations, the speed of the device 202 can be calculated or derived using Doppler speed data determined from a set of GPS carrier signals, rather than from position data. In implementations, the position module 210 can be or include other types or classes of location hardware, software, and/or services, such as location modules based on the known geographic location of cellular towers or their cells, location modules which operate based on radio triangulation techniques, or others. In implementations, for example, the position module 210 can also or instead be based on the Galileo satellite tracking system, and/or others.

The accelerometer module 212 can be or include a hardware, software, and/or other device built into or associated with the device 202, and configured to detect forces acting on the device 202, particularly changes in acceleration of the device 202, and/or other motion phenomena associated with the device 202. The accelerometer module 212 can be based on piezo-electric, capacitive, strain gauge, and/or other detection or sensor technology. The device 202 can optionally, in implementations, incorporate an altimeter module 218, such as a barometric altimeter, to sense current altitude values of the device 202.

In addition, the device 202 can be configured with an estimation module 216 to estimate a speed of the device 202 in the absence of current location information. Data from the position module 210, the accelerometer module 212, and the optional altimeter module 218 (when present) can, as shown, be used as input to the estimation module 216 for operations described herein.

The display 206 may show the estimated speed value as determined from the estimation module 216, the calculated speed value as determined from the position module 210, or a blend of the two speed values. In implementations, the speed value (calculated or estimated) can be displayed in miles per hour (as shown), but can also be configured to be displayed in feet per second, kilometers per hour, and/or other units or measures. Pace values, namely minutes per mile or other time over distance values, can also be displayed. In implementations, the display 206 can show a speed value (calculated or estimated) continuously, at regular intervals, upon receiving an input or selection from the user, and/or at other times or under other conditions.

The estimation module 216 and/or other hardware, module, application, and/or service can incorporate processor, memory, logic, software, and/or other resources to estimate speed values and conduct other operations, as described herein.

Figure 3:
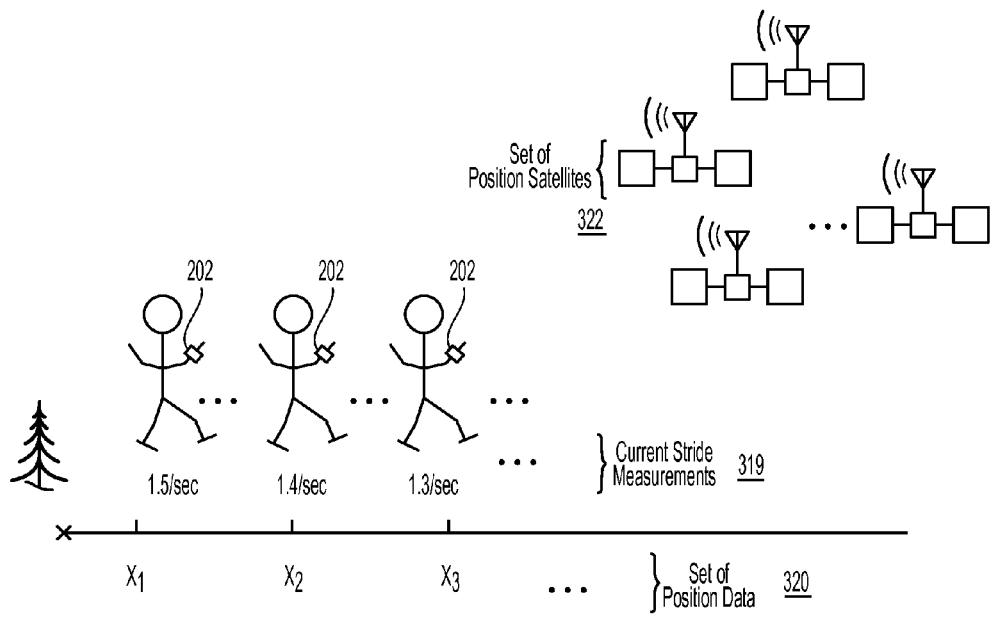
FIG. 3 illustrates an environment in which systems and methods for speed estimation based on stride data using predictive modeling can be used to estimate a speed value, according to various implementations.

In one illustrative operating mode, and as for example illustrated in FIG. 3, the device 202 can be worn, attached to, and/or carried by a user located in a relatively clear or unobstructed environment, such as an outdoor trail, track, and/or other set of surroundings that permit the receipt of signals from at least four position satellites 322, such as a set of GPS satellites or others. The user can use or operate the device 202 in connection with a variety of activities, including, for example, long distance running events, hiking on public trails, and other athletic, personal recreation, and/or other activities. During those or other activities, the device 202 can generate and capture various data to calculate or estimate a current speed of the user and/or device. That data can include, as shown, a set of current stride measurements 319, which can be captured using the accelerometer module 212. The current stride measurements 319 can include a set of stride frequency data, indicating how many strides per second the user of the device 202 is taking. In implementations, the current stride measurements 319 can also or instead include information such as a total number of strides, date and/or time of stride events, and/or other data.

In conditions or environments as shown in FIG. 3, the device 202 can also capture, generate, and/or receive a set of position data 320. The set of position data 320 can be received or derived from GPS or other signals received or processed by the position module 210. The position module 210 can use the set of position data 320 to calculate the current speed value of the device 202, by comparing the date and/or time stamp values for successive positions, $x_1, x_2, x_3, \ldots$, of the device 202 to the distance between those positions and generate a speed value. In implementations, the current speed value, as measured by the position module 210, can also or instead be averaged over a predetermined number of position measurements, and/or can be computed using other techniques using the set of position data 320. It may be noted that the calculated (current) speed data derived from the data produced by position module 210 can be sent to the estimation module 216 to be stored alongside with corresponding (current) stride data 319 from the accelerometer module 212, for the same time intervals.

According to implementations, it may be noted that while in an unobstructed environment such as illustrated in FIG. 3, the device 202 can be configured to display the calculated speed as generated by the position module 210. Speed values that are derived from the set of position data 320 and/or the set of position satellites 322 by position module 210 and/or other modules, logic, and/or software may be referred to at times herein as "calculated" speed values or outputs.

Figure 4:
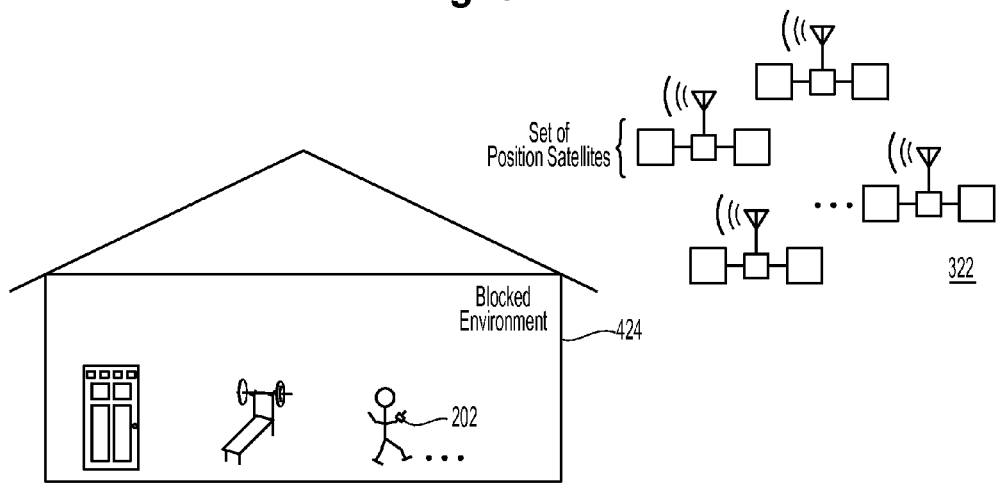
FIG. 4 illustrates a further environment in which systems and methods for speed estimation based on stride data using predictive modeling can be used to estimate a speed value, according to various implementations.

In other surroundings, and as for example shown in FIG. 4, the device 202 can be located in a blocked environment 424, such as the interior of a building, inside a gym, under extensive foliage, in densely constructed areas of a city (e.g., "urban canyons"), and/or other locations. In those types of blocked environment 424 or others, the device 202 may be unable to receive, or unable to receive with adequate or consistent signal strength, signals transmitted by the set of position satellites 322. In those types of operating conditions, the position module 210 may not be able to derive the set of position data 320 and associated information, such as the current calculated speed of the device 202. In those kinds of situations or others, the device 202 can be configured to switch the way in which the device 202 determines current speed to rely upon current stride measurements 319, rather than an unavailable set of position data 320. Speed values that are derived from current stride measurements 319 may be referred to at times herein as "estimated" or "predicted" speed values or outputs.

Figure 5:
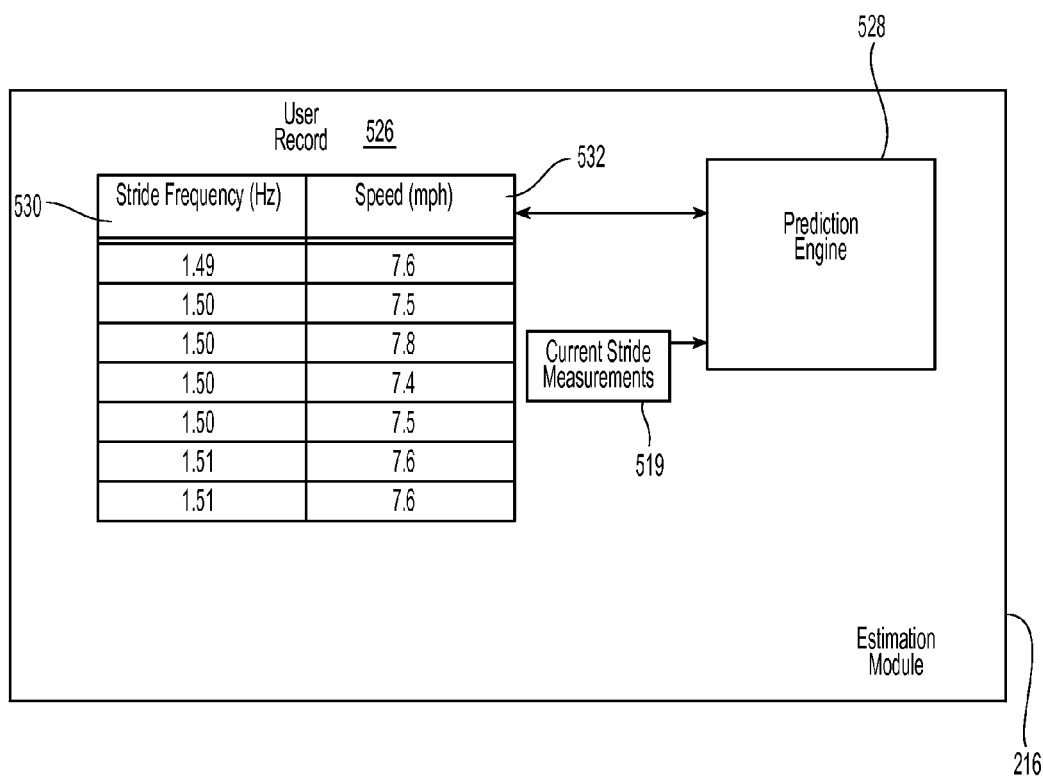
FIG. 5 illustrates various data tracking and analysis features that can be used in a speed tracking module, according to various implementations.

In those blocked environment operating conditions or others, and as shown for example in FIG. 5, the device 202 can operate on current stride measurements 519 and other information to generate an estimated current speed. In those cases and others, the estimation module 216 and/or other hardware, module, application, and/or service can access an individual's user record 526. In implementations, the user record 526 can store a set of previously captured or stored data related to the user's personal activity history and movement. In implementations, the user record 526 can include a set of stored or previous stride frequency data 530 from the accelerometer module 212 and a related set of previously calculated speed data 532 captured at the same time or time interval from the position module 210 for the user of the device. The prediction engine 528 uses probabilistic approaches and this individual's stochastically-related speed and stride history to generate an estimated or predicted current speed based on current stride information 319, 519.

In implementations as shown, the estimation module 216 and/or other hardware, module, application, and/or service can incorporate a prediction engine 528 to access the user record 526 and/or other data, and perform speed estimation and other operations. In implementations, the prediction engine 528 can be or include a Bayesian engine or model, in which the set of previous stride frequency data 530 and the set of previously calculated speed data 532 can be used to construct a joint probability distribution of those quantities. The joint probability distribution can relate the stride frequency data recorded during previous activities by the user to calculated speed data with which the user was traveling at those stride frequencies. As the accelerometer module 212 and/or other sensor, detector, application, and/or logic detects new or current stride measurements 519, the stride measurements 519 can be provided as input to the prediction engine 528 of the estimation module 216.

Using Bayesian or other prediction models or techniques, the prediction engine 528 and/or other model, engine, logic, application, and/or service can then use the current stride measurements 519 to generate an estimate of the user's current speed based on or derived from the previously calculated speeds 532 which were recorded when prior stride frequency data 530 was equivalent to the current stride frequency measurement. According to implementations, the use of a Bayesian model or engine in the prediction engine 528 will provide a minimum mean squared error estimate of the current speed for a given stride frequency measurement. It will however be appreciated that other modeling techniques, engines, algorithms, and/or calculations can be used.

According to aspects of the present teachings, the use of a prediction engine 528, rather than a strictly deterministic model or relationship between stride frequency and speed, allows flexibility to account for the non-linear, non-polynomial, or otherwise less than totally predictable correspondence between those variables. Those non-deterministic results can arise, for example, due to the fact that a user may at times reduce his stride frequency, yet increase his speed, by taking longer strides. The same user may increase both stride frequency and stride length during periods of peak exertion, leading to a greater than expected increase in speed. It will be further appreciated that systems and methods according to the present teachings likewise enjoy an advantage in terms of building a model based on the user record 526 that is uniquely tailored to the user's overall activity patterns. This avoids employing deterministic models or relations which assume that a certain walking stride frequency results in a particular speed or that a particular running stride frequency results in a certain speed. This approach is useful because, among other things, experimental data such as that shown in FIG. 1 demonstrates that such assumptions are not always valid, even for the same user.

By applying a prediction engine 528 that is stochastic or non-deterministic in nature, but trained to an individual user, the accuracy of the estimated speeds for that user over a variety of conditions can be increased. Moreover, the prediction engine 528 can evolve or refine the learned model of the user's speed and stride behavior over time, changing as the user's speed patterns change due to age, physical condition, types of activities, and/or other factors.

Thus, and merely for example, consider a scenario in which the accelerometer module 212 and/or other sensor, detector, application, and/or logic detects a current stride frequency of 1.50 Hz (strides per second) given the user record 526 in FIG. 5. In practice, user record 526 may have thousands of measurements or more, with a plurality of calculated speed measurements for each stride frequency value. In this example, however, user record 526 only contains four calculated speed measurements 532 recorded at a stride frequency 530 of 1.50 Hz. Three of these speeds are different, highlighting the non-deterministic nature of this problem. Possible reasons different calculated speeds may be recorded for a particular stride frequency include error in the accelerometer module 212, error in the position module 210, or error in both. Another possible reason for different calculated speeds is that the user may have changed stride length while maintaining a constant stride frequency. For these reasons and possibly others, the stride frequency and calculated speed can be treated as random variables F and V, respectively.

The prediction engine 528 can ameliorate the inaccuracies in the measurements of F and V through a probabilistic approach by generating an estimated speed equal to the expected value of speed for the measured stride frequency of 1.50 Hz, i.e., E[V|F=1.50], given a joint probability distribution generated by the data in user record 526. Computing the expected value of speed for a given stride frequency narrows the range of possible values from the entire joint probability distribution to a smaller range of values given by the conditional probability distribution of speed for the current stride frequency measurement. Mathematically, the estimated speed $\hat{v}$ is given by $$\hat{v} = E[V \mid F = 1.50] = \sum_{i=1}^{n} v_i \cdot p\{V = v_i \mid F = 1.50\}$$

where $v_i$ is one of the n unique speeds recorded in user record 526, and p{V=$v_i$|F=1.50} is the conditional probability that speed $v_i$ was measured when the stride frequency was measured to be 1.50 Hz. Given the user record 526 of FIG. 5 and assuming that it is the entire user record, the following conditional probabilities can be computed: p{V=7.4|F=1.50}=0.25, p{V=7.5|F=1.50}=0.50, and p{V=7.8|F=1.50}=0.25 and the speed estimate is therefore $\hat{v}$=(7.4)(0.25)+(7.5)(0.50)+(7.8)(0.25)=7.55 mph. In practice, the substantially larger amount of data in user record 526 will reduce any gaps in the previous stride frequency data, improve the accuracy of the speed estimation process, and help to reject statistical outliers.

In implementations, if the user continues to be located in the blocked environment 424, the current stride measurements 319, 519 can continue to be used to update the estimated current speed value. The display 206 can show the estimated speed determined using the current stride measurements and the probabilistic output generated by the prediction engine 528.

In implementations, the device 202 can continue to operate in an estimation mode based on current stride measurements 319, 519 until the device 202 clears the blocked environment and resumes the reception of location signals from the set of position satellites 322. Upon receiving those location signals, the device 202 can, in implementations, revert to receiving and processing GPS and/or other location signals from the set of position satellites 322, and switch to displaying those currently measured speed values as determined by the position module 210, instead of estimated speed values based on the output of the prediction engine 528. In further implementations, the device 202 can continue to display calculated speed values while simultaneously training the prediction engine 528 by continuing to record current stride frequency and current calculated speed data in the user record 526, for use in speed estimation at a future time.

In further implementations, the device 202 can be configured to remain in an estimation mode and continue to generate an estimated current speed based on the current stride measurements 319, even when the device 202 emerges from a blocked environment 424 and begins receiving signals from the set of position satellites 322 again. In operating modes of these types, the device 202 can receive the set of position data 320 at the position module 210, generate a current calculated speed based on that position data 320, and use that data and calculated speed to continue to train the prediction engine 528 at the same time that the prediction engine 528 is operating to generate an estimated speed. In operating modes of these types, the prediction engine 528 and device 202 can continue to learn and refine the Bayesian and/or other prediction model, taking advantage of the availability of the set of position data 320 when the device can receive signals from the set of position satellites 322.

In still further implementations, if a sufficiently large user record has been generated, based on memory usage, number of samples, or some other measure, additional training of the prediction engine 528 may not be necessary and thus the user record 526 may no longer need to be updated. In operating modes of this type, speed estimation can continue to be performed using the current user record 526 without continuing to update user record 526 with the latest stride frequency and calculated speed measurements.

In still further implementations, the device 202 can be configured to operate in a measurement mode using the set of position data 320 when that data is available, and to present the current calculated speed on the display 206 using speed values determined from the set of position satellites 322 when those signals are being received. In such implementations, the device 202 can be configured to perform certain further processing related to speed calculations, and in particular, to filter or condition the position data 320 produced by using the set of position satellites 322. In such modes or configurations, the estimation module 216 can receive the set of position data 320, and calculate a current speed value using that data. In aspects, it may be noted the set of position data 320 received and/or developed from the set of position satellites 322 can be received and processed in real time or near-real time, resulting in a current calculated speed value that can be displayed to the user on an immediate or near-immediate basis.

In modes as noted, before presenting a current calculated speed value to the user, the estimation module 216 and/or other hardware, module, application, and/or service can be configured to perform a data consistency check or operation on the current calculated speed value generated by the set of position data 320. The speed estimator module 216 and/or other hardware, module, application, and/or service can perform that check by continuing to generate an estimated speed value using the prediction engine 528 using the current stride measurements 319, 519 and, at the same time, in parallel or conjunction with the calculated speed value derived from the measured set of position data 320 generated by the set of position satellites 322.

In operation, signals received from the set of position satellites 322 can for example be corrupted due to radio frequency interference of various kinds, leading to a brief set of spurious or anomalous values in the set of position data 320. The estimation module 216 and/or other hardware, module, application, and/or service, in these filtering modes, can be configured to perform a comparison of the latest or current calculated speed value derived from the set of position data 320 to the latest or current estimated speed value, and determine whether the current calculated speed value calculated from the set of position data 320 deviates by more than a predetermined threshold from the estimated value.

If that calculated speed value exceeds the predetermined threshold, the current value displayed to the user can be temporarily switched to the speed value estimated from the current stride measurements 319, 519. Temporary outliers and/or false readings in the calculated speed data can thereby be filtered out and/or avoided. In implementations where the device 202 is also simultaneously training the prediction engine 528 using the current set of position data 320, the position, speed, and/or other values which deviate by more than the predetermined threshold can likewise be deleted from the data stream used as training sets for the Bayesian and/or other engine.

Figure 6:
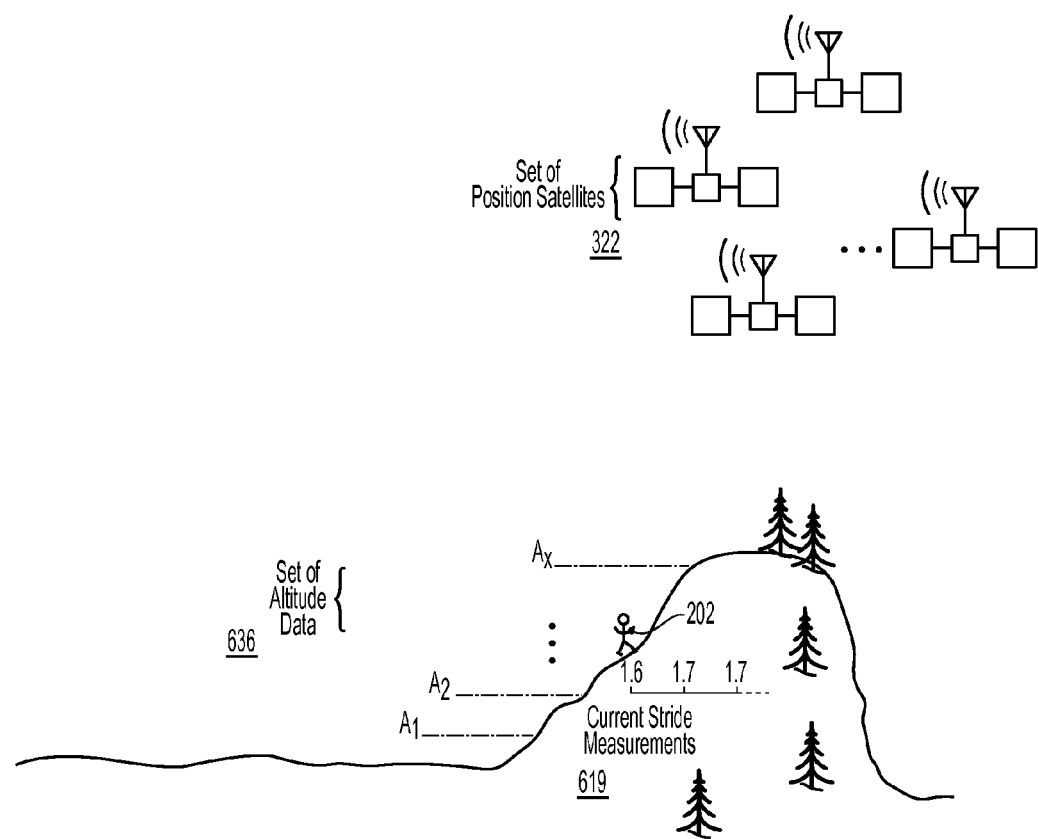
FIG. 6 illustrates a further environment in which systems and methods for speed estimation based on stride data using predictive modeling can be used to estimate a speed value, including the use of slope data, according to various implementations.

In certain implementations, the device 202 can also be configured to track and take into account an additional dimension of data when generating the estimated speed of the device 202. In particular, and as shown in FIG. 6, the device 202 can be configured to track the change in altitude (i.e., slope) of the device 202 when performing speed determinations, in addition to capturing or processing location, stride frequency, and other variables described previously. As shown in FIG. 6, the device 202 in such implementations can be configured to capture, store, and track a set of altitude data 636 indicating the altitude of the device 202 above a reference point, such as sea level. In these implementations, the set of altitude data 636 can also be contained in and/or derived from signals received from the set of position satellites 322, although it will be appreciated that in other implementations, other sources of altitude or elevation data can be used, such as the use of a separate altimeter module 218 in the device 202, itself. When incorporated in the device 202, the altimeter module 218 can be or include a barometric-type altimeter device. In implementations, slope values can be calculated from GPS data directly, and the estimation module 216 can use non-GPS altitude data from the altimeter module 218 and non-GPS stride frequency data from the accelerometer module 212, along with prior distribution data (stride frequency, calculated slope, calculated speed) stored in the user record for the current user, to estimate speed when GPS signals are not available.

In scenarios as shown, the device 202 can also capture a set of current stride measurements 619, including stride information described above. In aspects, a runner or other user traveling up or down the incline of a mountain, hill, and/or other irregular terrain may alter or adjust their speed and/or stride, based on the severity of the incline, the altitude of the terrain, and/or other factors.

Figure 7:
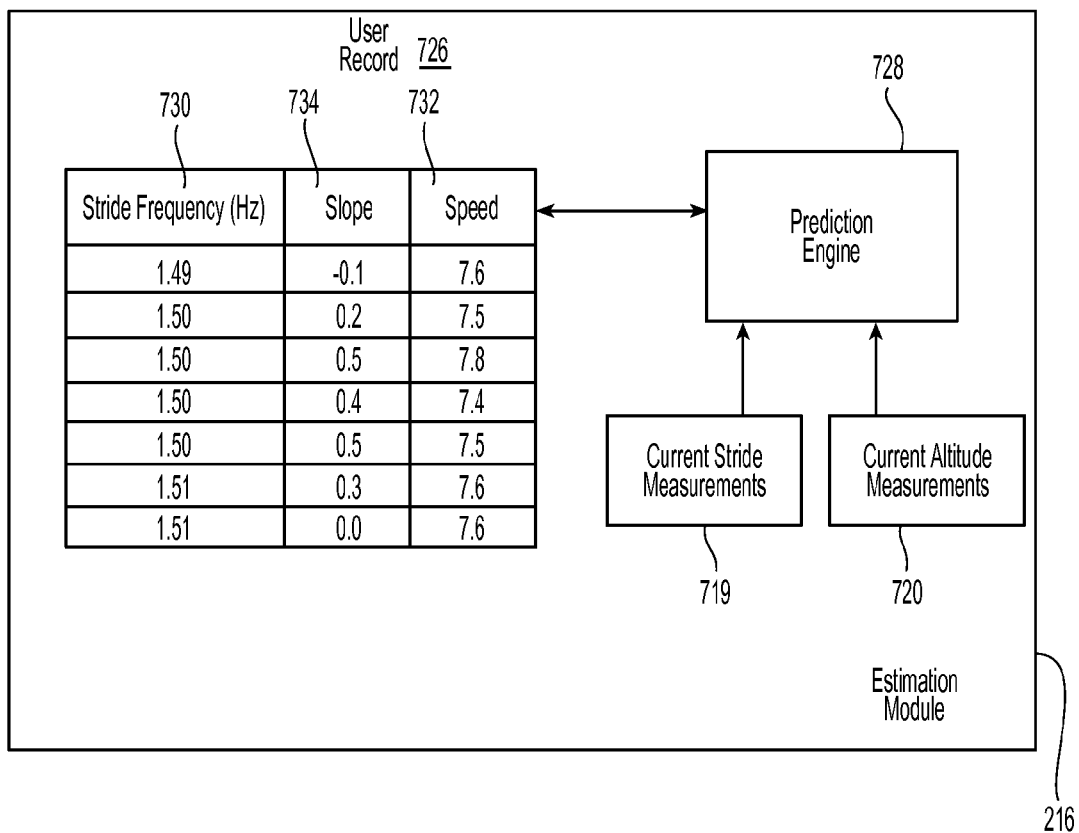
FIG. 7 illustrates various data tracking and analysis features that can be used in a speed tracking module, including the use of altitude or elevation data, according to various implementations.

In those kinds of environments or others, a stride frequency model that has been built up for that user in flat terrain may not lead to speed estimation values that remain accurate or fully accurate, due to expected compensations in the user's stride patterns or other physical behavior. As a result, in implementations that are configured to track elevation data, and as shown in FIG. 7, the estimation module 216 and/or other hardware, module, application, and/or service can be configured to track not just historical stride frequency data 730 and historical speed data 732, but also historical slope data 734, where slope data is calculated by dividing change in vertical distance (altitude) by change in horizontal distance. In implementations, as noted, the historical slope data 734 along with any currently received set of altitude data 636 can be received or generated by the position module 210, operating on signals received from the set of position satellites 322. In implementations as shown, the user record 726 can record that additional dimension of slope data. Thus, a predictive model may use the prior distribution data for stride frequency, calculated slope, and calculated speed.

When positioning information is not available, the current stride frequency measurement (e.g., as determined using accelerometer module 212) and the current altitude measurements (e.g., as determined using altimeter module 218) may be used in conjunction with the predictive model to estimate speed. Initially, the current stride frequency 619, 719 can be used by the prediction engine 728 as previously described with reference to FIG. 5 to obtain a preliminary estimated speed. This preliminary estimated speed can be converted to an estimated elapsed distance based on the time stamps of the current altitude measurements 720. Given a change in altitude from the current altitude measurements 720 and the estimated elapsed distance, the prediction engine 728 can calculate a current (estimated) slope value. With the current stride measurements 719 and the current slope value, the prediction engine 728 can use the augmented user record 726 to generate an estimated speed based on both the current stride measurements 619, 719 and the current altitude measurements 720 as follows: $\hat{v} = E[V|F=f, \Theta=\theta]$ where $\hat{v}$ is the estimated speed, F, $\Theta$, and V are the random variables of stride frequency, slope, and speed, respectively, and f and $\theta$ are the measured stride frequency and the current (estimated) slope value, respectively.

In implementations, the slope value can also or instead be estimated from the current altitude measurements 720 in a recursive fashion using the last slope and speed estimates produced by the prediction engine 728. In that case, the prediction engine 728 can estimate a horizontal displacement in the current sampling period by multiplying the horizontal speed by the duration of the current sampling period. The prediction engine 728 can then combine the estimated horizontal distance with the change in altitude during the current sampling period to produce an estimate of the current slope. In recursive implementations of this type, during initial conditions when no previous speed or slope values have been stored, the current stride frequency and an estimated slope of zero can be passed to the prediction engine 728, to begin computation. As noted, implementations incorporating slope values can be advantageous in hilly or mountainous terrain, and in other environments.

Figure 8:
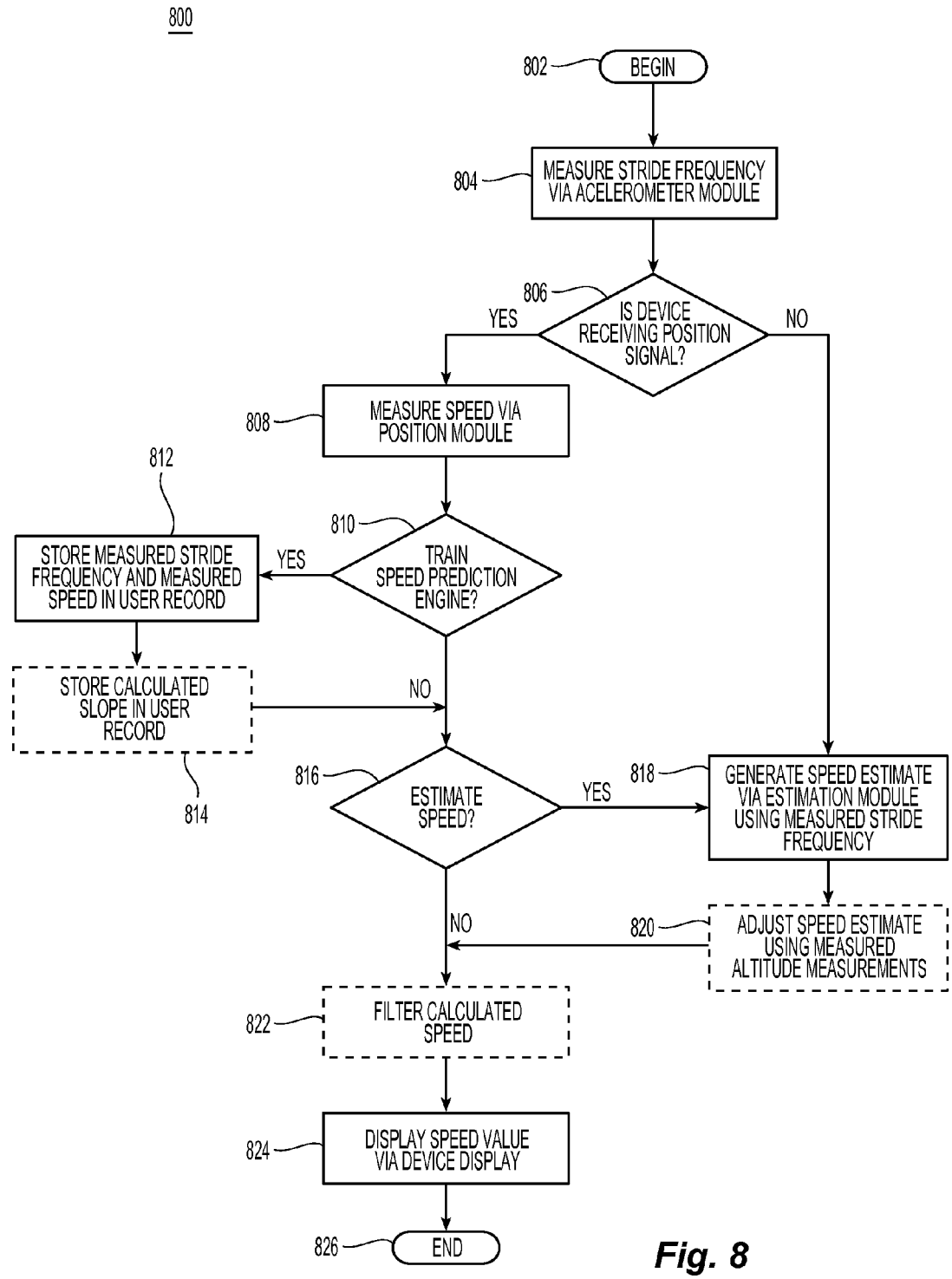
FIG. 8 illustrates a flowchart of processing that can be used in speed estimation based on stride data using predictive modeling, according to various implementations.

FIG. 8 illustrates a flowchart 800 of speed determination and other processing that can be performed in systems and methods for speed estimation based on stride data using predictive modeling, according to aspects. In step 802, speed estimation processing can begin. In step 804, the current stride frequency can be measured from the accelerometer module 212.

In step 806, a determination can be made whether the device 202 is receiving a position signal from the set of position satellites 322 via the position module 210. If the determination of 806 is yes, processing can proceed to step 808, otherwise processing can proceed to step 818. In step 808, the current calculated speed for the device 202 can be measured from the position module 210. In step 810, a determination may be made whether to train the speed prediction engine 528, 728. If the determination in step 810 is yes, processing can proceed to step 812, otherwise processing can proceed to step 816. In step 812, the current stride measurements 319 and the calculated speed are added to the user record 526, 726. In optional step 814, in implementations in which current altitude measurements 720 are used, the calculated slope can likewise be stored in the user record 526, 726.

In step 816, a determination can be made whether to estimate the current speed, or to use the currently calculated speed. If the determination in step 816 is yes, processing can proceed to step 818, otherwise processing can proceed to step 822. In step 818, a speed estimate is generated in the estimation module 216 using the current stride measurements 319, 619, which can be or include currently measured stride frequency values as detected by the accelerometer module 212. In optional step 820, in implementations using slope data and/or altitude data as described above in connection with FIGS. 6 and 7, the estimation module 216 can generate or adjust a speed estimate using the current altitude measurements 720, related slope values, or associated information. In step 822, the calculated speed can be filtered using the estimated speed, as an optional step. In step 824, the speed (either the calculated speed or the estimated speed) is displayed on display 206 of device 202. The speed estimation process ends in step 826. It may be noted that in implementations, the process illustrated in FIG. 8 can be executed for more than one user and/or at more than one time, for example at different times while the device 202 is being operated by different users, and results can be stored to one or more user record 526, 726.

It will be appreciated that while various processing activity, logical decisions, and/or other operations illustrated in FIG. 8 have been described as taking place in steps, that two or more of various of those operations or activities can be combined into one operation or activity, and that any one or more of those operations or activities can be divided into two or more operations or activities. Moreover, while those various operations or activities have been illustrated and described as occurring in a certain order, it will be appreciated that in implementations, those same and/or other operations or activities can take place in a different order or orders. Further, while various operations or activities have been described as being carried out by certain hardware, software, service, and/or other resources, it will be appreciated that in implementations, the same activities and/or operations can be carried out by other hardware, software, service, and/or other resources.

In implementations, it may be noted that the device 202 can comprise a number of hardware, software, firmware, communications, and/or other resources including a processor communicating with memory, such as electronic random access memory, operating under control of or in conjunction with an operating system, such as a mobile device operating system, which can host an application programming interface (API) and/or other components or resources. The processor can be incorporated in one or more microprocessors, microcontrollers, chips, servers, clusters, and/or other computers or hardware resources, and/or can be implemented using cloud-based resources. The RF circuitry 214 contained in the device 202 can be or include a transceiver, a modulator/demodulator, and other circuits. The device 202 can host further software including one or more applications, such as communications, messaging, texting, telephony, browser, and/or other applications or services. The device 202 can further host a data store, such as a database stored on a local solid state or other memory, to access or store position data, speed data, altitude data, Doppler data, stride data, and/or subsets of selections thereof, along with other content, media, or other data. Other configurations of the device 202, associated radio frequency hardware or software, network connections, and other hardware, software, and service resources are possible.

As used herein, each of a "model," a "module," and an "engine" can be or include hardware, software, firmware, logic, a self-learning network, and/or service resources, in any combination. Each of those entities can operate under software or other programmed control.

The foregoing description is illustrative, and variations in configuration and implementation may occur to persons skilled in the art. For example, while implementations have been described in which the device employs a single estimation module 216 and single prediction engine 528, 728, in implementations, more than one module can perform the same operations of those engines, models, and/or modules. Similarly, while implementations have been described in which the estimation module 216 and/or other hardware, module, application, and/or service accesses the user record 526, 726 of one user, in implementations, the device 202 can host the user records of multiple users. Other resources described as singular or integrated can in implementations be plural or distributed, and resources described as multiple or distributed can in implementations be combined. The scope of the present teachings is accordingly intended to be limited only by the following claims.

The invention claimed is:

1. A method of processing data, comprising:
   receiving a stride frequency measurement at a portable device;
   accessing a predictive model based on a nondeterministic association between a previous set of stride frequency data and a previous set of calculated speed data at corresponding time intervals; and
   generating an estimated speed value based on the stride frequency measurement and the predictive model.

2. The method of claim 1, wherein the nondeterministic association comprises a joint probability distribution between the previous set of stride frequency data and the previous set of calculated speed data.

3. The method of claim 1, wherein the predictive model comprises a Bayesian model.

4. The method of claim 1, further comprising:
   capturing a current set of position data at a current set of time data in the portable device; and
   generating a current calculated speed value based on the current set of position data and the current set of time data.

5. The method of claim 4, wherein capturing a current set of position data at a current set of time data comprises at least one of:
receiving a set of global positioning system (GPS) data, a set of Doppler data, or a set of cellular triangulation positioning data.

6. The method of claim 4, wherein capturing a current set of position data at a current set of time data comprises:
receiving a set of Doppler data.

7. The method of claim 6, further comprising:
filtering the current calculated speed value based on the estimated speed value.

8. The method of claim 4, further comprising:
filtering the current calculated speed value based on the estimated speed value.

9. The method of claim 4, further comprising:
recording the stride frequency measurement;
updating the predictive model based on the current calculated speed value and the stride frequency measurement.

10. The method of claim 1, wherein generating an estimated speed value comprises:
automatically generating the estimated speed value based on the stride frequency measurement when a current set of position data is unavailable.

11. The method of claim 1, wherein accessing a predictive model comprises:
accessing a predictive model associated exclusively with an individual user of the portable device.

12. The method of claim 1, wherein the predictive model is also based on a previous set of slope data.

13. The method of claim 12, wherein the estimated speed value is generated based on the stride frequency measurement, a current slope value, and the predictive model.

14. A device, comprising:
an accelerometer module; and
a processor, communicating with the accelerometer module, the processor being configured to
receive a stride frequency measurement from the accelerometer module,
access a predictive model based on a nondeterministic association between a previous set of stride frequency data and a previous set of calculated speed data at corresponding time intervals, and
generate an estimated speed value based on the stride frequency measurement and the predictive model.

15. The device of claim 14, further comprising:
a position module; and
wherein the processor is further configured to
receive a current set of position data from the position module, and
generate a current calculated speed value based on the current set of position data.

16. The device of claim 15, wherein the position module comprises:
a global positioning system (GPS) module or a cellular triangulation positioning module.

17. The device of claim 15, wherein the processor is further configured to update the predictive model based on the current calculated speed value and the stride frequency measurement.

18. The device of claim 14, further comprising:
an altimeter module coupled to the processor,
wherein the processor is configured to generate a slope measurement and the predictive model is also based on a previous set of calculated slope data.

19. The device of claim 18, wherein the estimated speed value is generated based on the stride frequency measurement, the slope measurement, and the predictive model.

20. The device of claim 14, further comprising:
a position module; and
wherein the processor is further configured to generate a current calculated speed value based on received Doppler data.

21. The device of claim 14, further comprising:
a display, coupled to the processor, configured to annunciate the estimated speed value.

* * * * *